United States Patent [19]

Hamada

[11] Patent Number: 4,914,395
[45] Date of Patent: Apr. 3, 1990

[54] METHOD AND APPARATUS FOR DETECTING PINHOLE

[75] Inventor: Yoshikazu Hamada, Tokyo, Japan

[73] Assignee: Nikka Densok Limited, Tokyo, Japan

[21] Appl. No.: 351,362

[22] Filed: May 12, 1989

[30] Foreign Application Priority Data

May 16, 1988 [JP] Japan .................. 63-118741

[51] Int. Cl.⁴ ............................................. G01R 31/12
[52] U.S. Cl. ..................... 324/557; 324/514
[58] Field of Search ............. 324/546, 558, 557, 514, 324/559; 361/14

[56] References Cited

U.S. PATENT DOCUMENTS

| | | | |
|---|---|---|---|
| 2,821,607 | 1/1958 | Baltensperger | 361/14 |
| 3,343,081 | 9/1967 | Lane | 324/558 |
| 4,125,805 | 11/1978 | Nagamatsu et al. | 324/558 |
| 4,243,932 | 1/1981 | Kakumoto et al. | 324/557 |

FOREIGN PATENT DOCUMENTS 2516991  10/1975  Fed. Rep. of Germany ...... 324/557

Primary Examiner—Reinhard J. Eisenzopf
Assistant Examiner—Maura K. Regan
Attorney, Agent, or Firm—Hoffmann & Baron

[57] ABSTRACT

A pinhole detecting apparatus includes a first electrode which may be a needle electrode or a brush electrode. The first electrode is positioned to be closed to or brought into contact with a member to be detected such as an insulation sheet which seals food, a closed container which contains medicine, or the like. Such a member to be detected is put on a second electrode which may be a conveyer made of electrically conductive material. When a high voltage is applied between the first and second electrodes, if a pinhole was formed on the member to be detected, a discharge current flows between the first and second electrodes through the pinhole, whereby the pinhole can be detected through detection of such a discharge current. A portion of the member to be detected below the first electrode is cooled by an air stream or other coolant when the high voltage is applied to the first and second electrodes, whereby the portion of the member to be detected is prevented from being thermally destroyed. Therefore, it becomes possible to increase the voltage being applied to the first and second electrodes.

10 Claims, 4 Drawing Sheets

F I G. 1
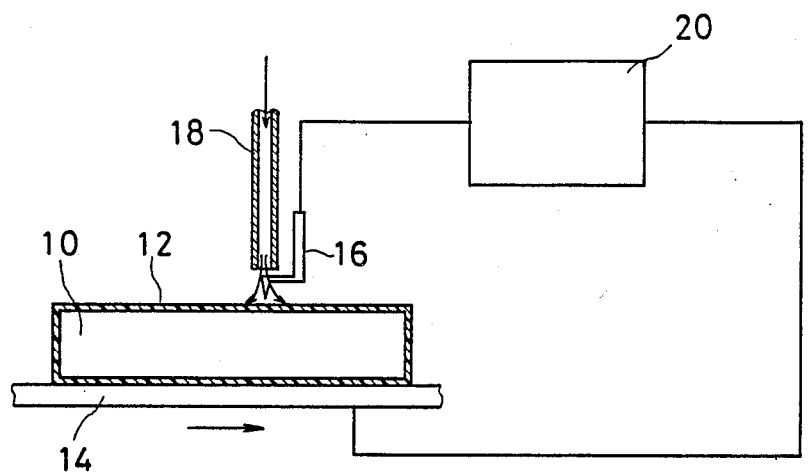
F I G. 2
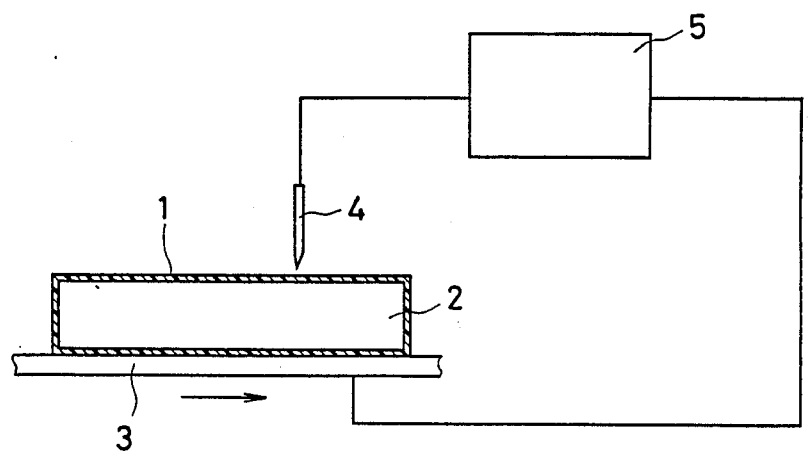

METHOD AND APPARATUS FOR DETECTING PINHOLE

BACKGROUND OF THE INVENTION

1. Field Of The Invention

The present invention relates to a method and apparatus for detecting a pinhole. More specifically, the present invention relates to a method and apparatus for detecting a pinhole, wherein a high voltage is applied to a sealing sheet which is made of a synthetic resin and seals food, etc. or a closed container which is made of a glass or the like and used as an ampoule for containing medicine, and a pinhole being in existence on the sealing sheet or the closed container can be detected through detection of a discharge current which flows though the pinhole of the sealing sheet or the closed container.

2. Description of the Prior Art

A method and apparatus for detecting a pinhole of an insulation container in which contents such as food are sealed or contained has been proposed in, for example, Japanese Patent Publication No. 6998/1975. In such a method and apparatus, a high voltage is applied to the insulation container and a discharge current is detected to determine whether or not a pinhole is formed on the container. More specifically, the container is sandwiched by a pair of electrodes and the high voltage is applied between the pair of electrodes, and if and when spark discharge occurs between the pair of electrodes and the contents of the container, it is determined that a pinhole or pinholes are formed on the container by detecting a discharge current which flows between the pair of electrodes due to existence of the pinhole or pinholes.

Recently, in order to detect a pinhole of food which is sealed by a packaging sheet, a method as shown in FIG. 2 has been adopted. With reference to FIG. 2, food 2 such as ham which is vacuum-packaged by a packaging member 1 made of a synthetic resin such as polyethylene is put on a conveyor 3 which constitutes one electrode. A needle electrode 4 which constitutes another electrode is positioned above the food 2 with a slight interval or air gap such that a tip end of the needle electrode 4 can face the food 2. A high voltage is applied between the conveyor 3 and the needle electrode 4 by a control circuit 5.

In the case where a pinhole or pinholes are formed on the packaging member 1, since spark discharge occurs between the tip end of the needle electrode 4 and the food 2 and the discharge current flows between the needle electrode 4 and the conveyer 3, by sensing or detecting a discharge current by the control circuit 5, the pinhole or pinholes being in existence on the packaging member 1 can be detected.

In the above described prior art, in the case where a packaging member 1 is formed by a material not having heat resistance such as a thin polyethylene sheet, a pinhole might be formed on the packaging member 1 by corona discharge which takes place due to application of the high voltage.

Specifically, it was confirmed through an experimentation that in the case where the packaging member 1 is a polyethylene sheet having thickness of 40 μm, if the voltage of 14 KV is applied between the both electrodes 3 and 4, a pinhole is formed on the polyethylene sheet for one or two seconds after the application of the voltage because the polyethylene sheet not having heat resistance is partially melted by heat generated by the corona discharge.

Therefore, in the case where the packaging member 1 is formed by the material not having heat resistance, in order to avoid such melting of the packaging member, the voltage being applied is to be lowered less than 10 KV. However, if the voltage being applied is lowered, detection accuracy is also decreased.

Especially, in the case of the food 2 such as salami, concave or convex is formed on a surface thereof as shown in FIG. 3, distance or air gap between the tip end of the needle electrode 4 and the packaging member 1 fluctuates when the food 2 is conveyed by the conveyer 3. Therefore, if the voltage is low, it becomes impossible to surely detect a pinhole or pinholes.

In addition, even if the packaging member is an ampoule made of a glass, it was found out through experience that a pinhole is also formed on the ampoule by the high voltage.

Therefore, in the prior art, in the case where the packaging member is formed by a material not having heat resistance, there is an antinomic problem that when the voltage to be applied is high a pinhole is undesirely formed on the packaging member, but when the voltage is lowered the detecting accuracy is reduced or it becomes impossible to detect a pinhole.

SUMMARY OF THE INVENTION

Therefore, a principal object of the present invention is to provide a novel method and apparatus for detecting a pinhole.

Another object of the present invention is to provide a method and apparatus for detecting a pinhole, wherein even though a packaging member is formed by a material not having heat resistance, it is possible to detect a pinhole with high detection accuracy.

In a method in accordance with the present invention, an electrode is positioned to be close to or brought into contact with an insulation member to be detected and a high voltage is applied to the electrode, and a pinhole being in existence on the insulation member to be detected can be detected by detecting a discharge current which flows through the electrode. During at least a time when the high voltage is applied to the electrode, a portion of the insulation member to be detected which faces the electrode is cooled by coolant such as an air stream.

A pinhole detecting apparatus in accordance with the present invention comprises: an electrode positioned to be closed to or brought into contact with an insulation member to be detected; means for applying a high voltage to the electrode; means for detecting a discharge current which flows through the electrode to determine whether or not a pinhole is formed on the insulation member to be detected; and means for cooling a portion of the insulation member to be detected where faces to the electrode.

In accordance with the present invention, since the portion of the insulation member to be detected (packaging member) where faces to the electrode is cooled by the cooling means during at least a timing when the high voltage is applied to the electrode, heat generated by corona discharge can be cooled by the cooling means. Therefore, even though the insulation member to be detected is formed by a material not having heat resistance, it becomes possible to apply a high voltage to the electrode in detecting a pinhole, and therefore, detecting accuracy drastically increases in comparison with a prior art.

In addition, in the case of food such as salami, in a prior art, since distance or air gap between the electrode and the insulation member to be detected is fluctuated due to unevenness of the surface thereof, it was impossible to detect a pinhole in the prior art; however, in accordance with the present invention, it becomes possible to detect a pinhole formed on such an uneven surface of the insulation member because the voltage higher than that of the prior art can be applied to the electrode.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 1 is an illustrative view showing one embodiment in accordance with the present invention.

FIG. 2 and FIG. 3 are illustrative views showing a prior art.

DETAIL DESCRIPTION OF THE PREFERRED EMBODIMENTS

Figure 3:
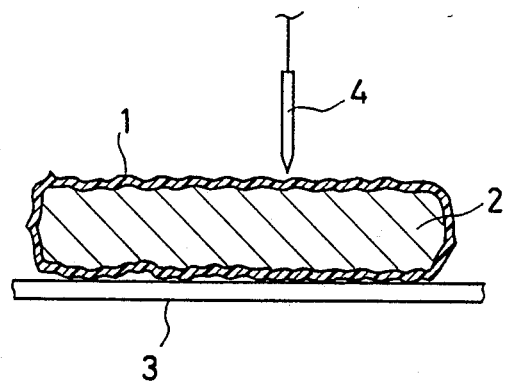

With reference to FIG. 1, ham 10 is vacuum-packaged by a packaging member 12 made of a polyethylene sheet having thickness of 40 $\mu$m and put on a conveyer 14 which is made of a material having electrical conductivity and constitutes one electrode. A needle electrode 16 which is made of a stainless steel and constitutes another electrode is positioned above the ham 10 such that a tip end of the needle electrode 16 can face the ham 10 with a slight interval or air gap. A high voltage is applied between the conveyer 14 and the needle electrode 16 by a control circuit 20 which is the same or similar to the control circuit 5 as shown in FIG. 2, and a discharge current is detected by the control circuit 20 to determine whether or not a pinhole or pinholes are formed on the packaging member 12.

More specifically, the control circuit 20 includes an oscillating circuit 22 for generating an alternative current (AC) voltage which is amplified by an amplifier 24 and applied to a high voltage transformer 26. An output of the high voltage transformer 26, that is, a high AC voltage is applied between the needle electrode 16 and the conveyer 14 via a suitable impedance means 28. As described above, a discharge current flows through the electrodes 14 and 16 when a pinhole or pinholes are in existence on the packaging member 12 of the food 10. Such a discharge current is converted into a voltage by an amplifier 30 and the voltage is inputted to a plus input of a comparator 32. A reference voltage generated by a variable resistor 34 is applied to a minus input of the comparator 32, and therefore, if the voltage from the amplifier 30 exceeds the reference voltage, the comparator 32 outputs a detection signal of the high level which is latched by a latch circuit 36. An output of the latch circuit 36 is inputted to a shift register 38 which receives a clock signal from a timing signal generator 40. The clock signal from the timing signal generator 40 is also applied to the latch circuit 36. Then, if and when the discharge current due to existence of a pinhole or pinholes is detected by the amplifier 30 and the comparator 32, a detection signal is outputted from an AND gate 42 which receives an output of the shift register 38 and the clock signal from the timing signal generator 40. The detection signal is delayed by a timer 44 by a suitable time period and applied to a transistor which is connected to a solenoid 46. When the detection signal is outputted, after the suitable time period, the transistor is turned on and the solenoid is energized, and therefore, a selection means (not shown) is acted to select and remove the food 10 which is packaged by the packaging member 12 on which a pinhole or pinholes are in existence.

Returning FIG. 1, the needle electrode 16 is bent in a stepped manner as shown in FIG. 1, and above the tip end of the needle electrode 16, a pipe 18 which is connected to a compressed air source (not shown) via an air supplying pipe and blows out an air is positioned. The pipe 18 is arranged such that a blowing out direction of the air can be crossed with a plane formed by the packaging member 12 at the right angle substantially. Therefore, an air stream is blown against a portion of a surface of the packaging member 12 where corona discharge occurs from a direction substantially in parallel with an extending direction of the needle electrode 16.

Thus, when the air stream is blown against the portion of the surface of the packaging member 12 where the corona discharge occurs, the portion is cooled by the air stream, and therefore, even if a high voltage is applied between the both electrodes 14 and 16, temperature at the portion of the surface of the packaging member 12 where the corona discharge occurs does not increase almost, and thus, a pinhole cannot be undesirely formed on the packaging member 12 even if the corona discharge takes place at that portion.

Now, a result of an experimentation of FIG. 1 embodiment is indicated in the following table. In FIG. 1 embodiment, when no air stream blown out from the pipe 18, as described above, a pinhole or pinholes were formed on the packaging member 12 for one or seconds after application of a voltage of 14 KV to the needle electrodes 16 and the conveyer 14.

TABLE

| Voltage | Packaging Member | Applying Time | Pinholes |
| --- | --- | --- | --- |
| 14 KV | A | 60 sec. | not formed |
| 14 KV | B | 37 sec. | formed |
| 14 KV | C | 60 sec. | not formed |
| 16 KV | A | 53 sec. | formed |
| 16 KV | B | 22 sec. | formed |
| 16 KV | C | 60 sec. | not formed |
| 18 KV | A | 38 sec. | formed |
| 18 KV | B | 15 sec. | formed |
| 18 KV | C | 43 sec. | formed |
| 20 KV | A | 14 sec. | formed |
| 20 KV | B | 7 sec. | formed |
| 20 KV | C | 21 sec. | formed |

Since a time required for detecting a pinhole is generally one second or two seconds, in the case where the air stream of the room temperature is blown out from the pipe 18 in FIG. 1, no pinholes due to the corona discharge were formed on the packaging member when the voltage is increased up to 20 KV; however, the voltage is increased more than 22 KV, a pinhole was formed due to the corona discharge in any kind (A, B, or C in the above table) of packaging member 12 for one or two seconds after application of the voltage.

Then, in the case where a cool air stream is blown out from the pipe 18 by adaptation of an action of adiabatic compression, it becomes possible to further increase a value of the voltage which is applied to the electrodes 14 and 16.

Figure 5:
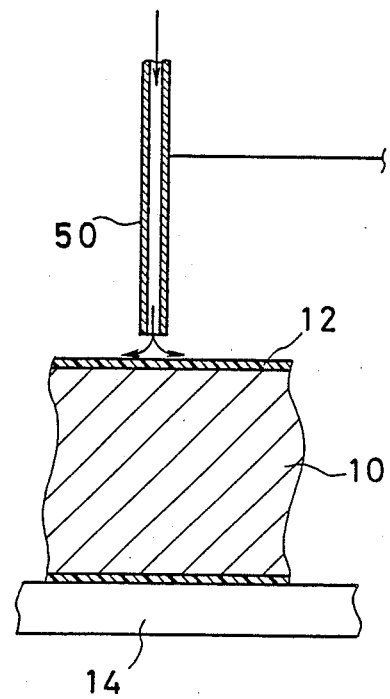
FIG. 5 is an illustrative view showing another embodiment in accordance with the present invention.
Figure 4:
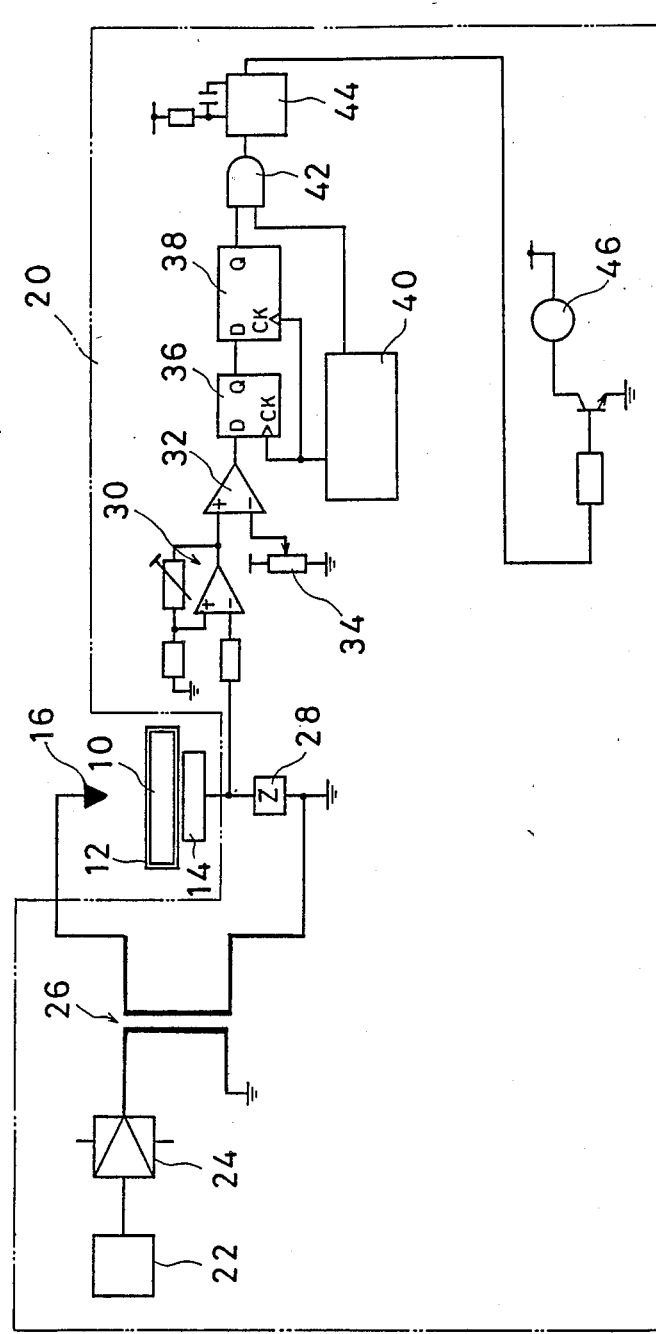
FIG. 4 is a circuit diagram of a control circuit which is adopted in FIG. 1 embodiment.

FIG. 5 is an illustrative view showing a second embodiment in accordance with the present invention. In this embodiment shown, the pipe 50 is formed by a stainless steel and an alternative current power source is connected to the pipe 50 such that a high voltage for detecting a pinhole can be applied to the pipe 50. Therefore, the pipe 50 is used as not only an electrode which is similar to the needle electrode 16 but also a pipe for supplying an air stream. Therefore, in this embodiment, it is not necessary to separately provide the needle electrode 16.

Figure 6:
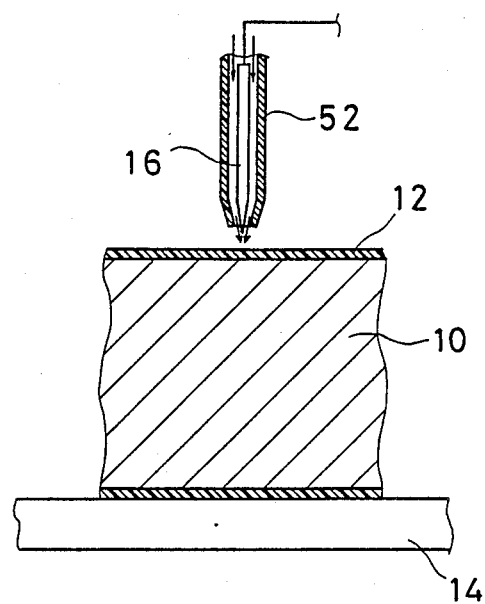
FIG. 6 is an illustrative view showing a further embodiment in accordance with the present invention.

FIG. 6 is an illustrative view shown a third embodiment in accordance with the present invention. In this embodiment shown, the needle electrode 16 is inserted or housed within a pipe 52 which is made of an insulation material. When the needle electrode 16 is thus inserted or housed within the pipe 52, it is not necessary to bend the needle electrode 16 in a stepped manner as shown in FIG. 1.

In addition, if a diameter of a lower portion of the pipe 52 is made be gradually small, the air stream can be intensively blown against the portion to be cooled.

Figure 7:
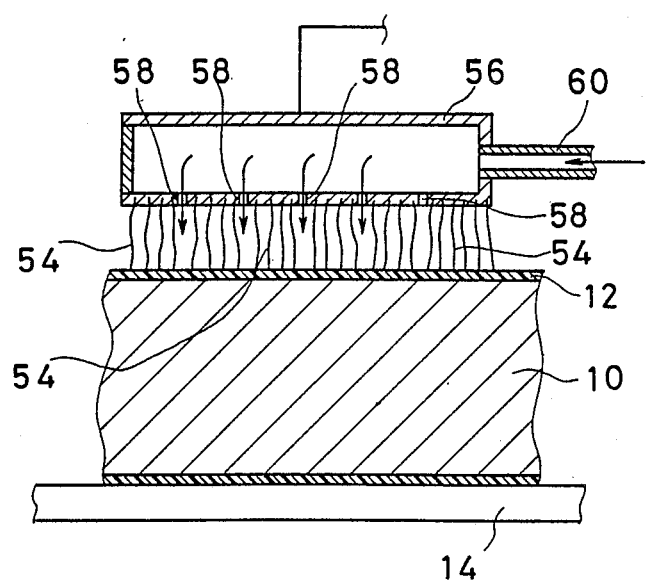
FIG. 7 is an illustrative view showing the other embodiment in accordance with the present invention.

FIG. 7 is an illustrative view showing a fourth embodiment in accordance with the present invention. FIG. 7 embodiment can be utilized in the case where the packaging member 12 is formed by a material having extremely poor heat resistance or the packaging member 12 is formed by a film having extremely thin thickness.

In FIG. 7 embodiment, electrode is formed by a metallic brush 54 which is studded on a lower surface of a metallic pipe 56, and free end of the brush electrode 54 is brought into contact with the packaging member 12 of the ham 10. At a portion of the pipe 56 where faces the packaging member 12 of the ham 10, a number of blowing holes 58 are formed, and an air supplying pipe 60 for supplying an air into the pipe 56 is connected to one end of the pipe 56. Therefore, when an air is supplied from the air supplying pipe 60, the air is blown out from the blowing holes 58 against the packaging member 12 of the ham 10 such that a portion of the packaging member 12 whereto the brush electrode 54 is brought into contact can be cooled by the air.

In addition, in the above described embodiments, an air stream is utilized as a cooling means, but instead of the air stream, gas coolant having flame resistance such as freon or insulation liquid having flame resistance can be utilized.

The present invention can be applied to detection of a pinhole of any insulation member, for example, packaging film or sheet made of synthetic resin which seals food such as ham or salami, an ampoule made of glass which contains medicine, a bottle made of synthetic resin, and so on.

Although the present invention has been described and illustrated in detail, it is clearly understood that the same is by way of illustration and example only and is not to be taken by way of limitation, the spirit and scope of the present invention being limited only by the terms of the appended claims.

WHAT IS CLAIMED IS

1. A method for detecting a pinhole, comprising steps of;
    (a) applying a high voltage to an electrode which is close to or brought into contact with an insulation member to be detected;
    (b) detecting a pinhole being in existence on the insulation member to be detected through detection of a discharge current which flows through the electrode; and
    (c) cooling a portion of the insulation member to be detected which faces said electrode during at least a time when the high voltage is applied to the electrode.

2. A method in accordance with claim 1, wherein said the step (c) includes a step for partially cooling the portion of the insulation member to be detected where faces the electrode by supplying fluid coolant.

3. A method in accordance with claim 2, wherein said step (c) includes a step for supplying any one selected from a group of an air, insulation gas having flame resistance and insulation liquid having flame resistance.

4. An apparatus for detecting a pinhole, comprising:
    an electrode close to or brought into contact with an insulation member to be detected;
    means for applying a high voltage to the electrode;
    means for detecting a discharge current which flows through the electrode;
    means for detecting a pinhole being in existence on the insulation member to be detected through detection of the discharge current; and
    means for cooling a portion of said insulation member to be detected which faces said electrode.

5. An apparatus in accordance with claim 4, wherein said means for cooling includes means for supplying fluid coolant to a portion to be cooled.

6. An apparatus in accordance with claim 5, wherein said means for supplying fluid coolant includes means for supplying any one selected from a group of an air, gas having flame resistance and insulation liquid having flame resistance.

7. An apparatus in accordance with claim 6, wherein said means for supplying fluid coolant includes a pipe positioned in the vicinity of said electrode for blowing the fluid coolant against the portion to be cooled of the insulation member to be detected.

8. An apparatus in accordance with claim 6, said electrode is formed by a pipe having electrical conductivity, and said fluid coolant is blown out from the pipe.

9. An apparatus in accordance with claim 6, wherein said means for supplying fluid coolant includes means for blowing out the fluid coolant in a direction that crosses at the right angle substantially to a plane formed by the insulation member to be detected.

10. An apparatus in accordance with claim 6, said electrode is formed as a brush electrode studded on a pipe which has a plane in parallel with a plane formed by the insulation member to be detected, and a number of blowing holes for blowing the fluid coolant are formed on the plane of the pipe.

* * * * *